US012096214B2

(12) United States Patent
Bahal et al.

(10) Patent No.: US 12,096,214 B2
(45) Date of Patent: Sep. 17, 2024

(54) ESTABLISHING A BACKUP CONNECTIVITY BETWEEN A SENSOR AND A MANAGEMENT SYSTEM

(71) Applicant: Hewlett Packard Enterprise Development LP, Houston, TX (US)

(72) Inventors: Rahul Bahal, San Jose, CA (US); Mohd Shahnawaz Siraj, San Jose, CA (US); Hao Lu, San Jose, CA (US); Kannan Konath, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 287 days.

(21) Appl. No.: 17/720,512

(22) Filed: Apr. 14, 2022

(65) Prior Publication Data
US 2023/0336983 A1 Oct. 19, 2023

(51) Int. Cl.
*H04L 12/06* (2006.01)
*H04W 12/06* (2021.01)
*H04W 12/08* (2021.01)
*H04W 12/73* (2021.01)

(52) U.S. Cl.
CPC ........... *H04W 12/06* (2013.01); *H04W 12/08* (2013.01); *H04W 12/73* (2021.01)

(58) Field of Classification Search
CPC ..... H04W 12/06; H04W 12/08; H04W 12/73; H04W 12/069
See application file for complete search history.

(56) References Cited

U.S. PATENT DOCUMENTS

| 9,762,392 | B2 | 9/2017 | Carrer et al. |
| 10,547,448 | B2 | 1/2020 | Cammarota et al. |
| 2018/0109418 | A1 | 4/2018 | Cammarota et al. |
| 2019/0306710 | A1 | 10/2019 | Cammarota et al. |
| 2019/0380034 | A1 | 12/2019 | Montemurro et al. |
| 2020/0022052 | A1* | 1/2020 | Gassend ............... H04W 36/14 |
| 2020/0221296 | A1 | 7/2020 | Jiang et al. |

(Continued)

FOREIGN PATENT DOCUMENTS

| WO | 2020/043730 A1 | 3/2020 |
| WO | 2020/043809 A1 | 3/2020 |

(Continued)

*Primary Examiner* — Baotran N To
(74) *Attorney, Agent, or Firm* — Hewlett Packard Enterprise Patent Department

(57) ABSTRACT

Examples described herein relate to a method for establishing a backup connectivity between a sensor and a management system. The sensor may be deployed in an IT infrastructure and configured to execute a one or more predetermined evaluations for the IT network and generate corresponding evaluation result. Thereafter, the sensor may determine whether a connection between the sensor and the management system via a primary connectivity is unsuccessful. In response to determining that the connection between the sensor and the management system via the primary connectivity is unsuccessful, the sensor may establish a backup connectivity by successfully connecting to an available wireless network using a security credential received by the sensor upon successful verification of public key information of the sensor via an authentication server. The sensor then transmits the evaluation result to the management system via the backup connectivity.

20 Claims, 7 Drawing Sheets

(56) References Cited

U.S. PATENT DOCUMENTS

| | | | | |
|---|---|---|---|---|
| 2021/0258787 A1* | 8/2021 | Bernsen | ............... | H04L 9/3073 |
| 2021/0329461 A1* | 10/2021 | Bernsen | ............... | H04W 12/50 |
| 2021/0385141 A1* | 12/2021 | Kim | .................. | H04L 63/1425 |
| 2021/0400502 A1* | 12/2021 | Zhang | ................. | H04W 76/14 |
| 2022/0167440 A1* | 5/2022 | Bernsen | ............... | H04W 76/14 |
| 2022/0191719 A1* | 6/2022 | Roy | ..................... | H04L 43/065 |
| 2023/0103179 A1* | 3/2023 | Gundavelli | ........... | H04W 76/10 |
| | | | | 370/242 |

FOREIGN PATENT DOCUMENTS

| | | |
|---|---|---|
| WO | 2020/092971 A1 | 5/2020 |
| WO | 2020/165013 A1 | 8/2020 |

* cited by examiner

ESTABLISHING A BACKUP CONNECTIVITY BETWEEN A SENSOR AND A MANAGEMENT SYSTEM

BACKGROUND

Some Information Technology (IT) infrastructures include network experience sensors (hereinafter referred to as sensors) that aid in monitoring and analyzing network connectivity and services running in the IT infrastructure. Data gathered from such sensors may be utilized to enhance a user experience. Such sensors may be deployed at various locations within the IT infrastructure (e.g., different floors of the building, different offices, etc.) and are programmed to run various tests as configured by a network administrator of the IT infrastructure to evaluate network connectivity and services running in the IT infrastructure. Based on the execution of the tests, the sensors may generate evaluation results and communicate the evaluation results to a management system hosted on a cloud. The management system may display the evaluation results on a dashboard accessible to the network administrator.

Typically, the sensors communicate with the management system via primary connectivity such as predefined cellular connectivity or non-cellular connectivity. Generally, the sensors use non-cellular connectivity such as Internet connectivity facilitated via the IT infrastructure to communicate with the management system. As it is understood, an interruption, a failure, and/or a lack of Internet connectivity at the IT infrastructure may not allow the sensors to communicate with the management system. Restoring the Internet connectivity, in such a case, requires additional configuration changes and/or providing a new network having Internet connectivity. Generally, restoring the Internet connectivity may involve a time-consuming manual intervention causing an on impact the testing and reporting of the IT infrastructure. On the other hand, the sensors with cellular connectivity leverage a cloud-managed subscriber identity module (SIM). However, in certain regions of the world, such cellular connectivity via the cloud-managed SIM is found to be nonreliable leading to an increase in overall capital cost and operational costs for the IT infrastructure. Further, with the increase in the number of sensors with cellular connectivity in the IT infrastructure, such costs may increase.

Furthermore, a specific problem with such sensors is that these sensors are generally remotely managed and have a minimal user interface using which a user can interact with the device. Also, for network security, the sensors require a specific configuration and a successful authentication before the sensors are connected to any network in case of failure of the primary connectivity to communicate with the management system. Therefore, it is not efficient to provision every sensor in the manner of traditional computers/cellular phones just in the sometimes-unlikely event that the wired network or wireless network to which the sensor is connected fails.

The challenges mentioned hereinabove may impact the reliability of the sensors in communicating evaluation results and therefore contribute to a bad user experience.

BRIEF DESCRIPTION OF THE DRAWINGS

One or more examples in the present disclosure are described in detail with reference to the following Figures. The Figures are provided for purposes of illustration only and merely depict examples.

Figure 1:
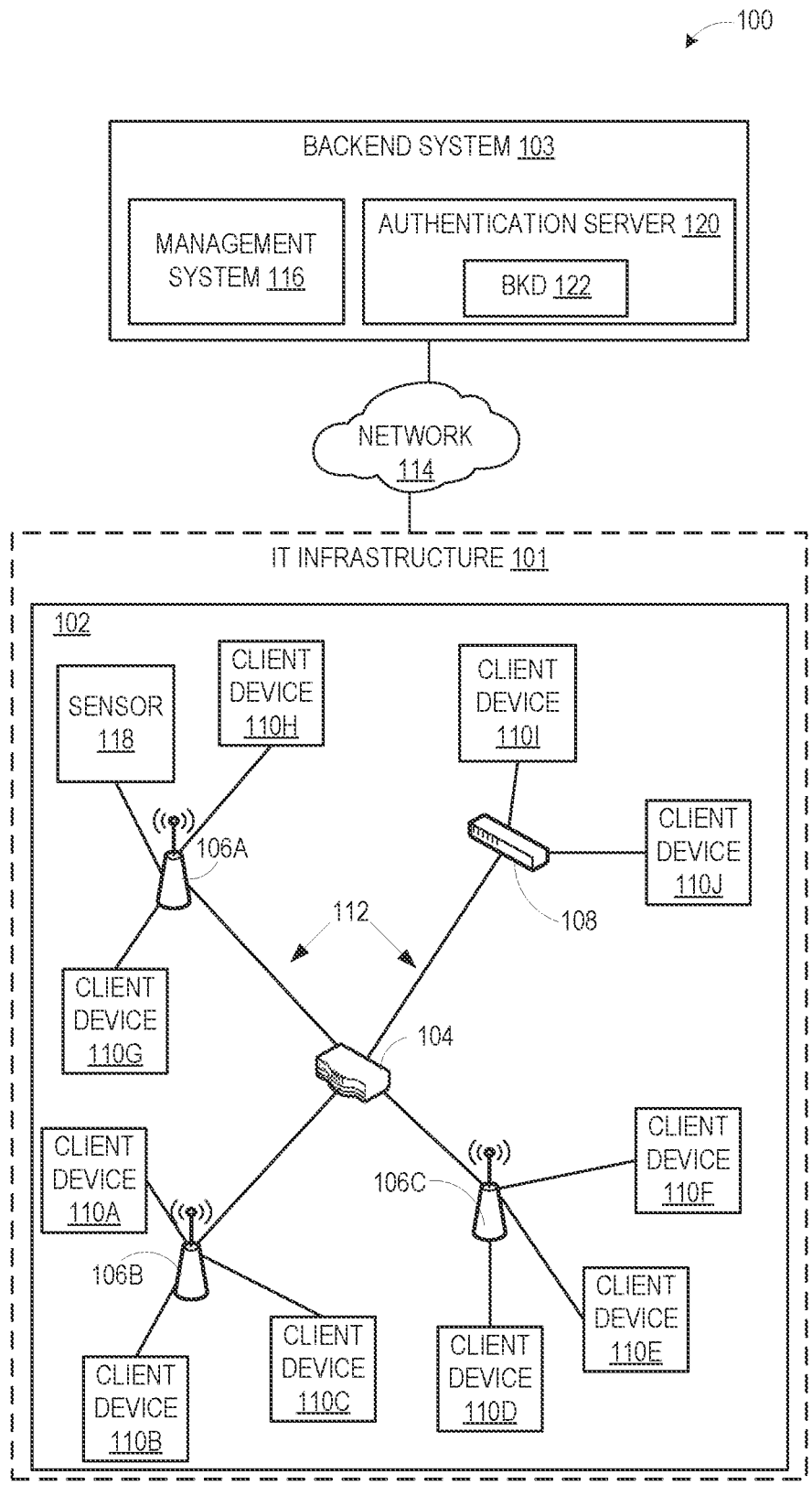
FIG. 1 depicts a system in which various of the examples presented herein may be implemented.

The Figures are not exhaustive and do not limit the present disclosure to the precise form disclosed.

DETAILED DESCRIPTION

IT infrastructures, such as datacenters or any other private or public networks, generally host several network devices interconnected to each other via wired or wireless connections. The IT infrastructure may be located within a single site in a particular region or distributed across several geographically separated sites. The network devices hosted in the IT infrastructure may include servers, storage devices, desktop computers, portable computers, network switches, routers, network gateways, access points (APs), etc. In some implementations, the IT infrastructure may also host one or more sensors to monitor, troubleshoot, and test the Wi-Fi and wired LAN as end-user. In particular, the sensors are configured to mimic an end-user behavior by simulating a user and the interactions it would perform in the network. Such sensors may provide a vendor-agnostic way for network monitoring, troubleshooting, and analyzing the IT infrastructure by continuous testing of wireless networks, wired networks, and applications from an end user's perspective.

Typically, a management system deployed on a platform (e.g., on a backend system) outside of the IT infrastructure may facilitate the management of the sensors. For example, the management system may facilitate the onboarding of the sensors, configuration, and deployment of tests on the sensors, and/or monitoring of the sensors. A network administrator (or an authorized user for such purpose) of the IT infrastructure may access the management system via an interactive dashboard to configure the sensors and/or deploy the tests on the sensors. The management system may communicate with the sensors via a device gateway hosted on the backend system to transmit test templates to the sensors. The sensors execute the test templates and generate evaluation results. Then, the sensors communicate the evaluation results back to the management system via the device gateway. The network administrator may utilize the information gathered from the dashboard to learn about the user experience in the IT infrastructure, determine a need for executing any additional tests, and/or implement any corrective action to fix issues if any.

The management system and the device gateway may be hosted on a cloud. The sensors communicate with the management system via primary connectivity such as predefined cellular connectivity or non-cellular connectivity. The sensors that do not support cellular connectivity use Internet connectivity facilitated via the IT infrastructure that hosts the sensors to communicate with the management system. In such an implementation, an interruption, a failure, and/or a lack of Internet connectivity at the IT infrastructure may not allow the sensors to communicate with the device gateway. In such a case, a network configuration at the IT infrastructure needs to be changed to enable the Internet connectivity for the sensor to communicate with the management system. Alternatively, a new network having Internet connectivity needs to be added to the IT infrastructure, which requires additional configuration and could impact the testing of the IT infrastructure. Moreover, in some implementations, wired or wireless connections at the IT infrastructure may be present for accessing the internal resources only and lack internet connectivity.

On the other hand, the sensors with cellular connectivity leverage a cloud-managed SIM and use a preconfigured mobile carrier in order to have Internet connectivity when there is no other mechanism (e.g., Wi-Fi with Internet connectivity) to reach the device gateway from the sensor. However, the use of the SIM and mobile data adds to the overall capital cost and operational costs for the IT infrastructure. Moreover, with the increase in the number of sensors in the IT infrastructure, such costs may further increase. Also, in certain regions of the world, the cloud-managed SIMs may not be very reliable leading to issues such as intermittent connectivity, stale roaming agreements preventing the sensors from using the mobile network, revocation of the connectivity by the cellular tower, etc. The challenges mentioned hereinabove may contribute to a bad user experience due to customer concerns about the reliability of the sensors and the management system.

Moreover, a specific problem with such sensors is that these sensors are generally remotely managed and have a minimal user interface using which a user can interact with the device. Further, for network security, the sensors require specific configuration and a successful authentication before they are connected to any network in case of failure of the primary connectivity to communicate with the management system. Therefore, it is not efficient to provision every sensor in the manner of traditional computers/cellular phones just in the sometimes-unlikely event that the wired network or wireless network to which the sensor is connected fails. IT infrastructure sensors need to be configured to be flexibly deployable anywhere in the network. Predetermining where and how the sensor is going to be deployed is impractical. Furthermore, many sensors will not have to use any backup connectivity because they will be connected to reliable wired or wireless networks.

Therefore, the present disclosure describes a method whereby a sensor deployed in an IT infrastructure can self-provision to an available wireless network in the event it needs to communicate with a management system (e.g., to upload evaluation results) but has lost the primary connectivity it was preconfigured with. The primary connectivity is a connection established via the Ethernet or a pre-configured Wi-Fi (e.g., a preconfigured service set identifier (SSID)) using which the sensor is preconfigured to communicate with the management system. The method employs a public-private cryptographic key system of authentication through an authentication server. Each sensor is registered with the management system and the management system, at periodic intervals or upon request by the authentication server, provides public bootstrapping keys of such registered sensors to the authentication server.

The sensor continuously monitors the primary connectivity to determine if it is connected to the management system via the primary connectivity. In the event the sensor loses the primary connectivity, the sensor proactively initiates establishing the backup connectivity without any manual intervention. To establish the backup connectivity with the management system, the sensor proactively initiates a connection process to get itself authenticated via the authentication server. The authentication server stores a bootstrap key database comprising information related to public keys of registered sensors of the management system. The authentication server verifies public key information of the sensor using the bootstrap key database to authenticate the sensor. Upon successful authentication of the sensor, the sensor receives network access information. The network access information may include a name (e.g., SSID) of an available wireless network to which the sensor can connect and a security credential. Using the security credential, the sensor connects to the SSID which in turn allows the sensor to communicate with the management system. In some examples, the sensor transmits evaluation results that it has generated for the IT infrastructure to the management system.

As will be appreciated, the proposed method provides an additional way for the sensor to establish connectivity back to the management system without requiring any changes to the sensor's hardware. In particular, in situations where the primary connectivity (e.g., preconfigured Ethernet or Wi-Fi connection) configured for the sensor fails or is not connected, the sensor can upload the evaluation results via the backup connectivity without affecting the testing of the IT infrastructure. Also, the use of the proposed backup connectivity avoids the need to configure a new wired or wireless network on the IT infrastructure. For instance, if the IT infrastructure has a network that doesn't have the required endpoints (e.g., network endpoint to reach the management system) whitelisted, the use of the backup connectivity avoids any requirement of creating a new network just to upload the evaluation results. In particular, the use of the backup connectivity provides a seamless connection between the management system without impacting the testing of the IT infrastructure, thus, improving the user experience.

Also, the backup connectivity is proactively established via the sensor itself in an automated way without any manual intervention. This saves configuration effort for the network administrator of the IT infrastructure and reduces the support dependency on support engineers. In some examples, the sensor that supports the cellular connectivity may be configured to prioritize the use of the backup connectivity over the cellular connectivity to upload the evaluation results thereby reducing an operational cost for the sensor and minimizing any reliability issues related to the cellular connectivity thereby improving user experience.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed systems and methods in detail, it is useful to describe an example network installation with which these systems and methods might be implemented in various applications. FIG. 1 illustrates a system 100 in which various of the examples presented herein may be implemented. The system 100 may include an IT infrastructure 101 and a backend system 103 that aids in monitoring the IT infrastructure 101. The IT infrastructure 101 may be a network of devices (hereinafter referred to as network devices) implemented for an organization, such as a business, educational institution, governmental entity, healthcare facility, or other organization. This diagram illustrates an example IT infrastructure implemented for an organization having multiple users and possibly one or more physical or geographical sites. For illustration purposes, one such site 102 is depicted in FIG. 1. In some examples, the IT infrastructure 101 may be implemented with more than one site, with similar or different configurations as that of the site 102, without limiting the scope of the present disclosure.

The site 102 may be an office network, home network, or other network installation. The site 102 may be a private network, such as a network that may include security and access controls to restrict access to authorized users of the private network. Authorized users may include, for example, employees of a company at the site 102, residents of a house, customers at a business, and so on. In some examples, the site 102 may, optionally, include a controller 104 that is in communication with the network 114. The controller 104 may provide communication with the network 114 for the site 102, though it may not be the only point of communication with the network 114 for the site 102. In some examples, the controller 104 may communicate with the network 114 through a router (not shown). In other implementations, the controller 104 may provide router functionality to the devices in the site 102. In some examples, the controller 104 may be a WLAN controller.

The controller 104 may be operable to configure and manage network devices, such as at the site 102, and may also manage network devices at other remote sites, if any, within the IT infrastructure 101. The controller 104 may be operable to configure and/or manage switches, routers, access points, and/or client devices connected to a network. The controller 104 may itself be, or provide the functionality of, an access point (AP). In some examples, the controller 104 may be in communication with one or more switches 108 and/or APs 106A-106C. The switches 108 and the APs 106A-106C may provide network connectivity to various client devices 110A, 110B, 110C, 110D, 110E, 110F, 110G, 110H, 110I, and 110J (hereinafter collectively referred to as client devices 110A-110J). Using a connection to the switch 108 or one or more of the AP 106A-106C, one or more of the client devices 110A-110J may access network resources. Examples of client devices 110A-110J may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, smart terminals, dumb terminals, virtual terminals, video game consoles, virtual assistants, IOT devices, and the like.

Within the site 102, the switch 108 is included as one example of a point of access to the network established in site 102 for wired client devices 110I and 110J, for example. The client devices 110I and 110J may connect to the switch 108 and through the switch 108, may be able to access other devices within the IT infrastructure 101. The client devices 110I and 110J may also be able to access the network 114, through the switch 108. The client devices 110I and 110J may communicate with the switch 108 over a wired connection 112. In the illustrated example, the switch 108 may communicate with the controller 104 over a wired connection 112, though this connection may also be wireless, in some examples.

The APs 106A-106C are included as another example of a point of access to the network established in site 102 for client devices 110A-110H. Each of APs 106A-106C may be a combination of hardware, software, and/or firmware that is configured to provide wireless network connectivity to wireless client devices 110A-110H. The APs 106A-106C may communicate with the controller 104 and the network 114 over connections 112, which may be either wired or wireless interfaces.

The network 114 may be a public or private network, such as the Internet, or another communication network to allow connectivity between the IT infrastructure 101 and the backend system 103. The network 114 may include third-party telecommunication lines, such as phone lines, broadcast coaxial cable, fiber optic cables, satellite communications, cellular communications, and the like. The network 114 may include any number of intermediate network devices, such as switches, routers, gateways, servers, and/or controllers, which are not directly part of the IT infrastructure 101 but that facilitate communication between the various parts of the IT infrastructure 101, and between the IT infrastructure 101 and other network-connected entities.

Further, the site 102 may host one or more sensors. For illustration purposes, in IT infrastructure 101 of FIG. 1, the site 102 is shown to host one such sensor, for example, a sensor 118 communicatively connected to the AP 106A. In some examples, more than one sensor may be deployed in the IT infrastructure depending on the number of APs and the number of sites in the IT infrastructure 101. For example, in one implementation such as an office set-up, one sensor may be deployed for every five APs. In another example implementation such as a retail store, one sensor may be deployed in one site. In yet another example implementation such as a large public venue (e.g., a stadium or a conference center) one sensor may be deployed for every ten APs.

The sensor 118 may be an example representative of the client devices 110A-110J. In another example, the sensor 118 may be a user experience insight sensor that is configured to mimic an end-user behavior by simulating a user and the interactions it would perform in the network. In yet another example, the sensor 118 may be a low power device, an IoT device, or any other software-defined or hardware-based device capable of collecting and transmitting data. The term "low powered device", as used herein, refers to a device specifically designed for lower power consumption compared to typical servers or network equipment. The term "IoT device", as used herein, refers to a hardware device, an actuator, a gadget, an appliance, or any other machine, that is programmed for a certain application and can transmit data over the Internet or other networks to the management system 116. The sensor 118 may also be a mobile device, industrial equipment, environmental measurement equipment, medical device, or any other equipment. In certain examples, the sensor 118 may also be software components executing on any such equipment.

The backend system 103 may be hosted on a network outside the IT infrastructure 101 or within the IT infrastructure 101. In some examples, the backend system 103 may be deployed on a cloud platform hosted on a public, private, or hybrid cloud outside the IT infrastructure 101. The backend system 103 may host a management system 116 and an authentication server 120 communicatively coupled to the IT infrastructure 101 via the network 114.

The management system 116 and the authentication server 120 may be computing systems, for example, computers, controllers, servers, or storage systems hosted on a public cloud, a private cloud, or a hybrid cloud. In certain examples, the management system 116 and the authentication server 120 may be suitable devices having a hardware processing resource (not shown), such as one or more central processing units (CPUs), semiconductor-based microprocessors, and/or other hardware devices suitable for retrieval and execution of instructions stored in a machine-readable storage medium (not shown). In certain other examples, the management system 116 and the authentication server 120 may be implemented as software resources, such as, but not limited to, software applications, virtual machines (VMs), containers, containerized applications, or pods. In some examples, the management system 116 may be implemented as a service running on a "cloud computing" environment or as a "software as a service" (SaaS). The management system 116 and the authentication server 120 may be offered as a stand-alone product, a packaged solution, and can be utilized on a one-time full product/solution purchase or pay-per-use basis. Although the authentication server 120 is shown as deployed in the backend system 103, in some examples, the authentication server 120 may be deployed outside of the backend system 103.

In some examples, the authentication server 120 may implement device provisioning and authentication protocols, for example, a device provisioning protocol (DPP) and a Remote Authentication Dial-In User Service (RADIUS) protocol. In some examples, as will be described in greater detail hereinafter, the authentication server 120 may authenticate the sensor 118 that is trying to establish a backup connection using a DPP-based authentication. Further, in some examples, the authentication server 120 facilitates, as per the RADIUS protocol, a centralized authentication, authorization, and accounting management for users/network devices (e.g., the sensor 118) who connect and use a network after a successful DPP-based authentication.

Furthermore, in some examples, the authentication server 120 stores, in a bootstrap key database (BKD) 122, bootstrapping information of the sensors (e.g., including the sensor 118) that are registered with the management system 116. The term "bootstrapping information" as used herein may refer to information such as, but not limited to, a public bootstrapping key of the sensors. In some examples, during manufacturing, the sensor 118 may be embedded with key pairs (e.g., a public bootstrapping key and a private key). The public bootstrapping key of the sensor 118 may be registered with the management system 116 when the sensor 118 is deployed in the IT infrastructure 101. In some examples, the authentication server 120 may query the management system 116, to obtain the public bootstrapping key of the sensors that are registered with the management system 116. In response, the authentication server 120 may receive the public bootstrapping key from the management system 116 and store it in the bootstrap key database 122. The bootstrap key database 122 may periodically be updated by synchronizing its content with the management system 116.

During operation, the management system 116 may facilitate onboarding of the sensor 118, configuration and deployment of tests, and/or monitoring of the sensor 118. A network administrator (or an authorized user for such purpose) of the IT infrastructure 101 may access the management system 116 via an interactive dashboard to configure the sensor 118 and/or deploy evaluation templates on the sensor 118. An evaluation template corresponding to a given test (e.g., website test) may include a set of program instructions or a packaged application. The sensor 118 may execute the evaluation templates to generate data corresponding to one or more performance metrics (e.g., connection with a given website successful or not, response time, download speed, upload speed, etc.) specified in the given test. Then, the sensor 118 may communicate the evaluation results back to the management system 116.

In some examples, the sensor 118 is configured with primary connectivity via a predefined connectivity medium (e.g., a preconfigured Wi-Fi or Ethernet) to communicate with the management system. Examples of the primary connectivity between the sensor 118 and the management system 116 may include a preconfigured or predefined direct connection, VPN connection, Software-Defined Wide Area Networking (SDWAN) connection, wired connection, wireless connection (e.g., Wi-Fi connection), an Ethernet connection, or any other suitable connection. The primary connectivity may be established between the sensor 118 and the management system 116 through a predefined connectivity medium. In one example, the predefined connectivity medium may be the Ethernet. In another example, the predefined connectivity medium may be a preconfigured Wi-Fi connection. For example, during the setup of the sensor 118, the sensor 118 may be configured with a Service Set Identifier (SSID) advertised via the AP 106A. Accordingly, the sensor 118 may communicate with the management system 116 via the configured SSID. The primary connectivity between the sensor 118 and the management system 116 may be a persistent or a non-persistent connection. The persistent connection, as used herein, refers to a network communication channel that remains open. Non-persistent connection, as used herein, refers to network communication that may be interrupted, established on-demand, or otherwise maintained in a non-persistent manner.

During operation, an IT infrastructure may experience an interruption, a failure, and/or a lack of internet connectivity which, if not remedied, may restrict a sensor from communicating with the management system. Accordingly, the sensor may not be able to send the evaluation results to the management system. Such a lack of communication between the sensor and the management system may result in a bad user experience due to customer concerns about the reliability of the sensor and the IT infrastructure.

In accordance with the aspects of the present disclosure, a method for establishing backup connectivity between the sensor 118 deployed in an IT infrastructure 101 and the management system 116 is presented. In particular, the sensor 118 self-provisions to an available wireless network in the IT infrastructure 101 in the event it needs to communicate with the management system 116 but has lost the primary connectivity it was preconfigured with. During operation, the sensor 118 continuously monitors the primary connectivity to determine if the sensor 118 is connected to the management system 116 via the primary connectivity. In the event the sensor loses the primary connectivity, the sensor 118 proactively initiates establishing the backup connectivity without any manual intervention.

To establish the backup connectivity with the management system 116, the sensor 118 proactively initiates a connection process to get itself authenticated via the authentication server 120. The authentication server verifies the public key information of the sensor 118 using the bootstrap key database 122 to authenticate the sensor 118. Upon successful authentication of the sensor 118, the sensor 118 receives network access information. The network access information may include a name (e.g., SSID) of an available wireless network to which the sensor 118 can connect and a security credential. Using the security credential, the sensor 118 connects to the SSID which in turn allows the sensor 118 to communicate with the management system 116. The sensor 118 transmits evaluation results that it has generated for the IT infrastructure 101 to the management system 116 via the backup connectivity established via the available wireless network. Additional details regarding the role of an example authentication server in establishing the backup connectivity are described in conjunction with a sequence diagram depicted in FIG. 7.

As will be appreciated, the proposed method provides an additional way for the sensor 118 to establish the connectivity back to the management system 116 without requiring any changes to the sensor's hardware. In particular, in situations where the primary connectivity configured for the sensor 118 fails, the sensor 118 can upload the evaluation results via the backup connectivity without affecting the testing of the IT infrastructure 101. Also, the use of the proposed backup connectivity avoids the need to configure a new wired or wireless network on the IT infrastructure 101. For instance, if the IT infrastructure 101 has a network that is unable to reach to required endpoints (e.g., network endpoint of a device gateway to reach the management system) whitelisted, use of the backup connectivity avoids any requirement of creating a new network just to upload the evaluation results. This saves configuration effort for the network administrator of the IT infrastructure 101 and reduces the support dependency. In some examples, in an implementation where the sensor 118 supports cellular connectivity, the sensor 118 may be configured to prioritize the backup connectivity over the cellular connectivity to upload the evaluation results leading to reduced usage of cellular data and hence, saving operational costs.

Figure 2:
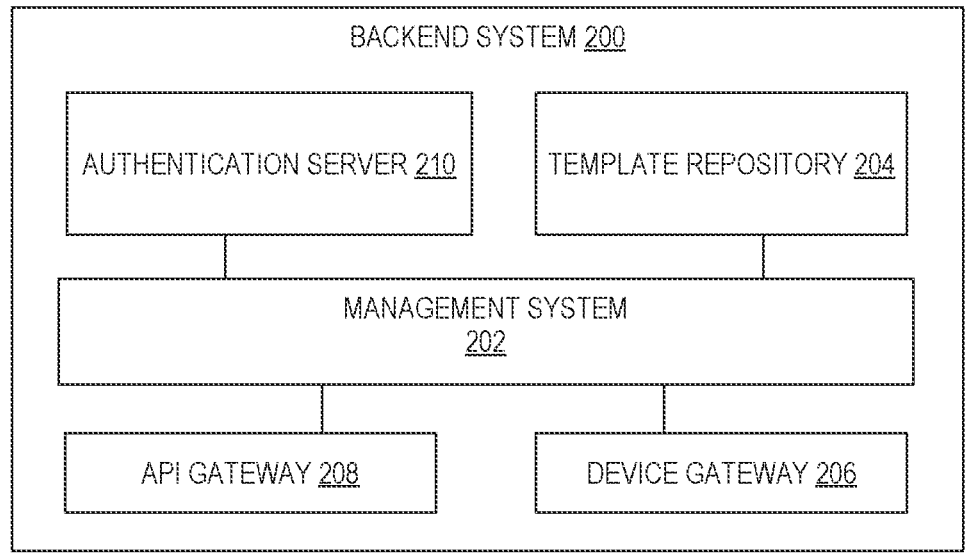
FIG. 2 depicts a block diagram of an example backend system.

Referring now to FIG. 2, an example backend system 200 is presented. The backend system 200 may be hosted on a single computing device or is distributed across multiple computing devices. In some examples, the backend system 200 may host a management system 202, a template repository 204, a device gateway 206, an application programming interface (API) gateway 208, and an authentication server 210.

The management system 202 and the authentication server 210 may be example representatives of the management system 116 and the authentication server 120 of FIG. 1, certain details of which are not repeated herein. The management system 202 and the authentication server 210 may be implemented as computing systems, for example, computers, controllers, servers, or storage systems hosted on a public cloud, a private cloud, or a hybrid cloud. In certain other examples, the management system 202 and the authentication server 210 may be implemented as software resources, such as, but not limited to, software applications, virtual machines (VMs), containers, containerized applications, or pods. During operation, the management system 202 may facilitate onboarding of sensors, configuration and deployment of tests, and/or monitoring of the sensors. The authentication server 210 is configured to facilitate a sensor in establishing the backup connectivity by performing authentication of the sensor during a network provisioning and network access stages. Additional details regarding the role of an example authentication server in establishing the backup connectivity are described in conjunction with a sequence diagram depicted in FIG. 7.

The template repository 204 may be a physical storage system, virtual storage, or a database. The template repository 204 may be used to store several evaluation templates that may be deployed on the sensor for the sensor to generate respective evaluation results. Some example evaluation templates stored in the template repository may include network performance by performing tests such as an AP scan, an SSID check, a DHCP check, a gateway check, an external connectivity check, an AP association check, and the like. Additionally, in some examples, the template repository 204 may also store internal resource evaluation templates and/or external resource evaluation templates. In some examples, the sensor may be preconfigured with one or more such evaluation templates.

An evaluation template corresponding to the test such as the AP scan may be deployed on the sensor to scan Wi-Fi network to collect information corresponding to basic SSIDs (BSSIDs), received signal strength indicator (RSSI) values, channel information, etc. Further, an evaluation template corresponding to the test such as the SSID check may be deployed on the sensor to check whether the configured SSIDs on the sensor are available in the Wi-Fi network. Further, an evaluation template corresponding to the test such as the DHCP check may be deployed on the sensor to check if the sensor can obtain an IP address using DHCP. Further, an evaluation template corresponding to the test such as the gateway check may be deployed on the sensor to check if a configured gateway (e.g., the device gateway 206 or any other gateway to be tested) is reachable. Also, an evaluation template corresponding to the test such as the external connectivity check may be deployed on the sensor to check if the sensor can connect to an external endpoint (e.g., a Uniform Resource Locator (URL) or an IP address of the management system 116). Moreover, an evaluation template corresponding to the test such as the AP association check may be deployed on the sensor to check if the sensor can associate with a particular AP and how long it takes to complete such association. The internal resource evaluation templates may be deployed on the sensor to evaluate user experience for internal resources such as, file servers, web servers, intranet sites, and employee utility portals (e.g., human resources portal, payroll portal, training portal, etc.). Moreover, external resource evaluation templates may be deployed on the sensor to evaluate user experience for external resources such as websites (e.g., "www.facebook.com", "www.twitter.com", "www.netflix.com", etc) and applications.

The management system 202 and the sensor deployed in the IT infrastructure may communicate with each other via the device gateway 206. The device gateway 206 may be a hardware device or software application that acts as a "gate" between the backend system 200 and the IT infrastructure. Communication between the management system 202 and the sensor may be routed via the device gateway 206. For example, the management system 202 may transmit the evaluation templates to the sensor via the device gateway 206. Similarly, the sensor may transmit the evaluation results to the management system 202 via the device gateway 206. The device gateway 206 may be implemented via a router, firewall, server, or another device that enables traffic to flow in and out of the network. In some examples, the device gateway 206 may also translate the evaluation result or any other information received from the sensor into a format or protocol recognized by the management system 202, or vice versa.

Further, the API gateway 208 may be software or a service offered via a cloud platform hosting the backend system 200. The API gateway 208 may allow developers to create, publish, maintain, and/or monitor APIs such as representational state transfer (REST) APIs and/or WebSocket APIs. In some examples, the API gateway 208 may be used to publish data to a dashboard API hosted on a user portal. In particular, the management system 202 may communicate information associated with the evaluation results generated by the sensor to a dashboard via the API gateway 208. The API gateway 208 publishes such information to the dashboard API which in turn displays the information on the dashboard. The management system 202 may generate and display (or otherwise show) on an end-user device, for example, a mobile phone or computer upon the end-user device accessing a user portal (e.g., a website) or an application. The user portal and/or the application may be hosted on a cloud. The dashboard may be a simple-to-use graphical user interface (GUI) providing visibility on the performance and health of an IT infrastructure. Using the information displayed on the dashboard, a network administrator can easily identify problems and perform remediation actions. Also, the dashboard may allow the user to select and deploy evaluation templates on the sensor.

Figure 3:
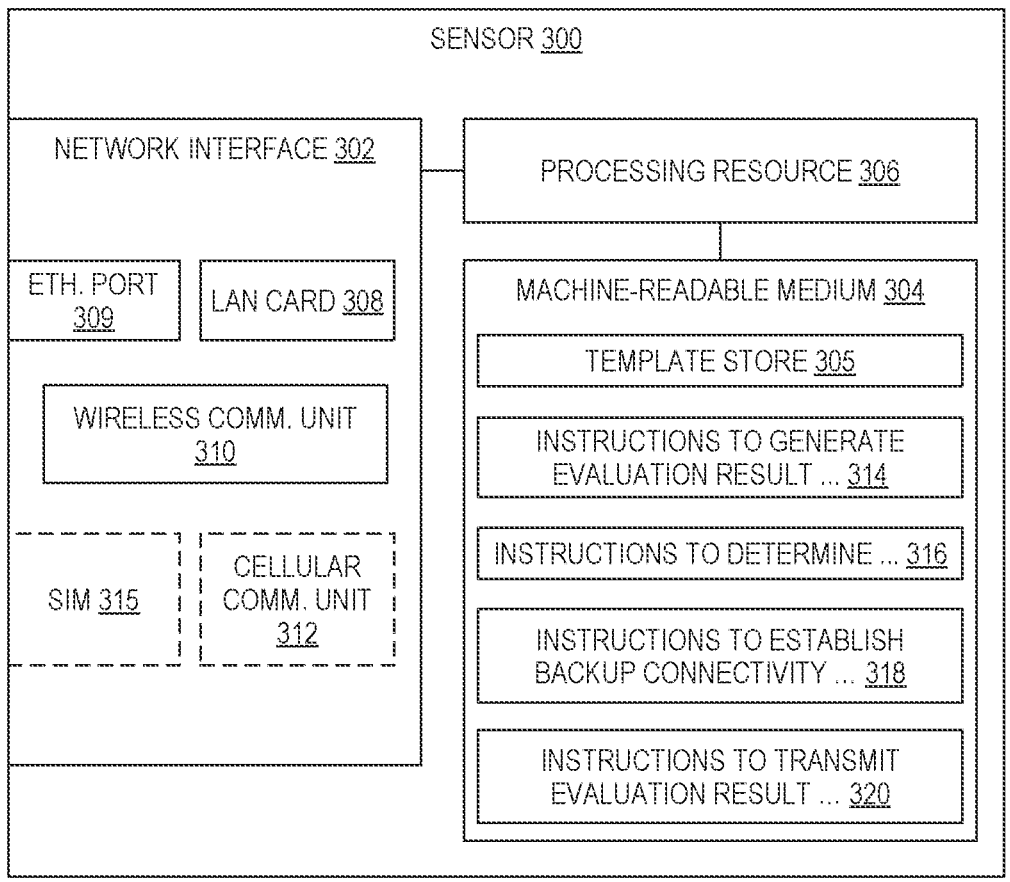
FIG. 3 depicts a block diagram of an example sensor.

Referring now to FIG. 3, an example sensor 300 is presented. The sensor 300 may be an example representative of the sensor 118 depicted in FIG. 1. In some examples, the sensor may include a network interface 302, a machine-readable storage medium 304, and a processing resource 306. The network interface 302 may enable the sensor 300 to communicate with other network devices. In particular, the sensor 300 may communicate with a management system via the network interface 302. The network interface 302 may include one or more connectivity media. For example, the network interface 302 may include one or more of a local area network (LAN) card 308, a wireless communication unit 310 (e.g., Wi-Fi chip/module), or a cellular communication unit 312. The LAN card 308 allows the sensor 300 to communicate with other network devices via an Ethernet port 309. Although the sensor 300 is shown to include one Ethernet port 309, the sensor 300 may also have more than one Ethernet port. The wireless communication unit 310 may allow communication in accordance with IEEE 802.11 standards. The cellular communication unit 312 may allow the sensor to communicate using cellular communication techniques. In some examples, the cellular communication unit 312 may host a cellular connectivity medium such as a SIM 315. The SIM 315 may be configured with a predefined mobile carrier to enable cellular voice and/or data communications.

The machine-readable storage medium 304 may be non-transitory and is alternatively referred to as a non-transitory machine-readable storage medium 304 that does not encompass transitory propagating signals. The machine-readable storage medium 304 may be any electronic, magnetic, optical, or any other storage device that may store data and/or executable instructions. Examples of the machine-readable storage medium 304 that may be used in the sensor 300 may include Random Access Memory (RAM), non-volatile RAM (NVRAM), an Electrically Erasable Programmable Read-Only Memory (EEPROM), a storage drive (e.g., a solid-state drive (SSD) or a hard disk drive (HDD)), a flash memory, a CD-ROM, and the like.

Further, in some examples, the machine-readable storage medium 304 may also include a template store 305. The template store 305 stores the evaluation templates that are received from the management system for the sensor to execute. As configured via the management system, the processing resource 306 may execute one or more of the evaluation templates and generate respective evaluation results. The processing resource 306 may communicate the evaluation results to the management system via the network interface 302. In particular, during normal operation, the processing resource 306 may communicate with the management system via a primary connectivity established through the LAN card 308 (e.g., Ethernet) or the wireless communication unit 310 (e.g., Wi-Fi chip/module).

The machine-readable storage medium 304 may be encoded with executable instructions 314, 316, 318, and 320 (hereinafter collectively referred to as instructions 314-320) for performing the method 400 described in FIG. 4, for example. Although not shown, in some examples, the machine-readable storage medium 304 may be encoded with certain additional executable instructions to perform any other operations performed by the sensor 300, without limiting the scope of the present disclosure.

The processing resource 306 may be a physical device, for example, a central processing unit (CPU), a microprocessor, a graphics processing unit (GPU), a field-programmable gate array (FPGA), application-specific integrated circuit (ASIC), other hardware devices capable of retrieving and executing instructions stored in the machine-readable storage medium, or combinations thereof. The processing resource 306 may fetch, decode, and execute the instructions stored in the machine-readable storage medium 304 to establish a backup connectivity between the sensor 300 and the management system. As an alternative or in addition to executing the instructions 314-320, the processing resource 306 may include at least one integrated circuit (IC), control logic, electronic circuits, or combinations thereof that include a number of electronic components for performing the functionalities intended to be performed by the sensor 300.

In some examples, the instructions 314 when executed by the processing resource 306 may cause the processing resource 306 to generate an evaluation result for an IT infrastructure hosting the sensor 300. For example, one or more evaluation templates may be deployed on the sensor 300 and are stored in the template store 305 via the management system. The processing resource 306 may execute one or more of the evaluation templates to generate respective evaluation results. In some examples, the processing resource may execute one or more evaluation templates to generate data corresponding to one or more performance metrics (e.g., connection with a given website successful or not, response time, download speed, upload speed, etc.) a specified in the respective tests. The generated data may be collated by the processing resource 306 in the form of the evaluation result.

The instructions 316 when executed by the processing resource 306 may cause the processing resource 306 to determine whether a connection between the sensor 300 and the management system via the primary connectivity is unsuccessful. The instructions 318 when executed by the processing resource 306 may cause the processing resource 306 to establish the backup connectivity with the management system in response to determining that a connection between the sensor and the management system via a predefined connectivity medium is unsuccessful. To establish the backup connectivity with the management system, the processing resource 306 proactively initiates a connection process to get the sensor 300 authenticated via an authentication server. The authentication server verifies a public key information of the sensor 300 and upon successful authentication of the public key information of the sensor 300, the processing resource 306 receives network access information. The network access information may include a name (e.g., SSID) of an available wireless network to which the sensor 300 can connect and a security credential. Using the security credential, the processing resource 306 may connect the sensor 300 to the SSID which in turn allows the sensor 300 to communicate with the management system.

Further, the instructions 320 when executed by the processing resource 306 may cause the processing resource 306 to transmit an evaluation result to the management system via the backup connectivity. Additional details of operations performed by the sensor are described in conjunction with FIGS. 4-7.

Figure 4:
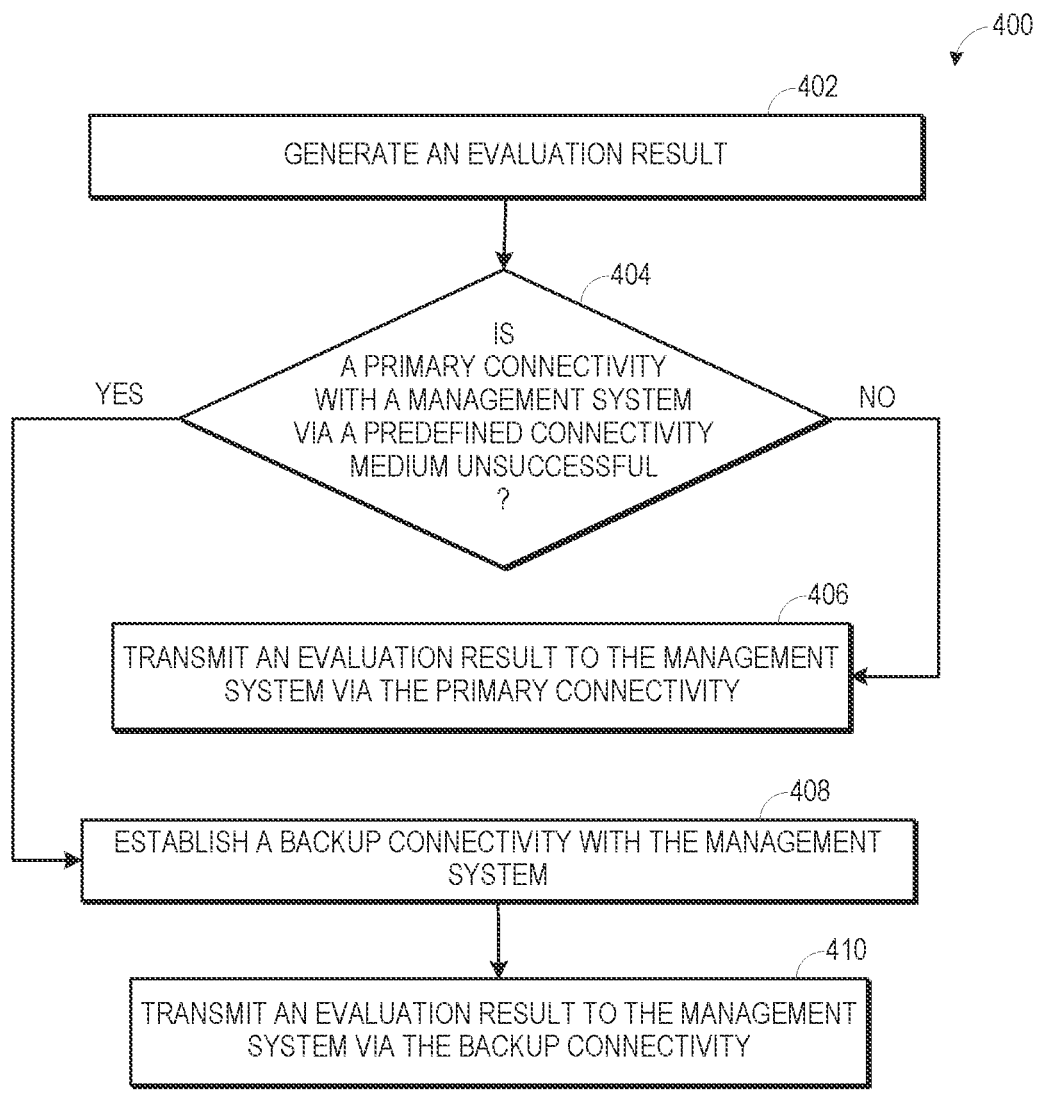
FIG. 4 depicts a flowchart of an example method for establishing backup connectivity between a sensor and a management system.
Figure 5:
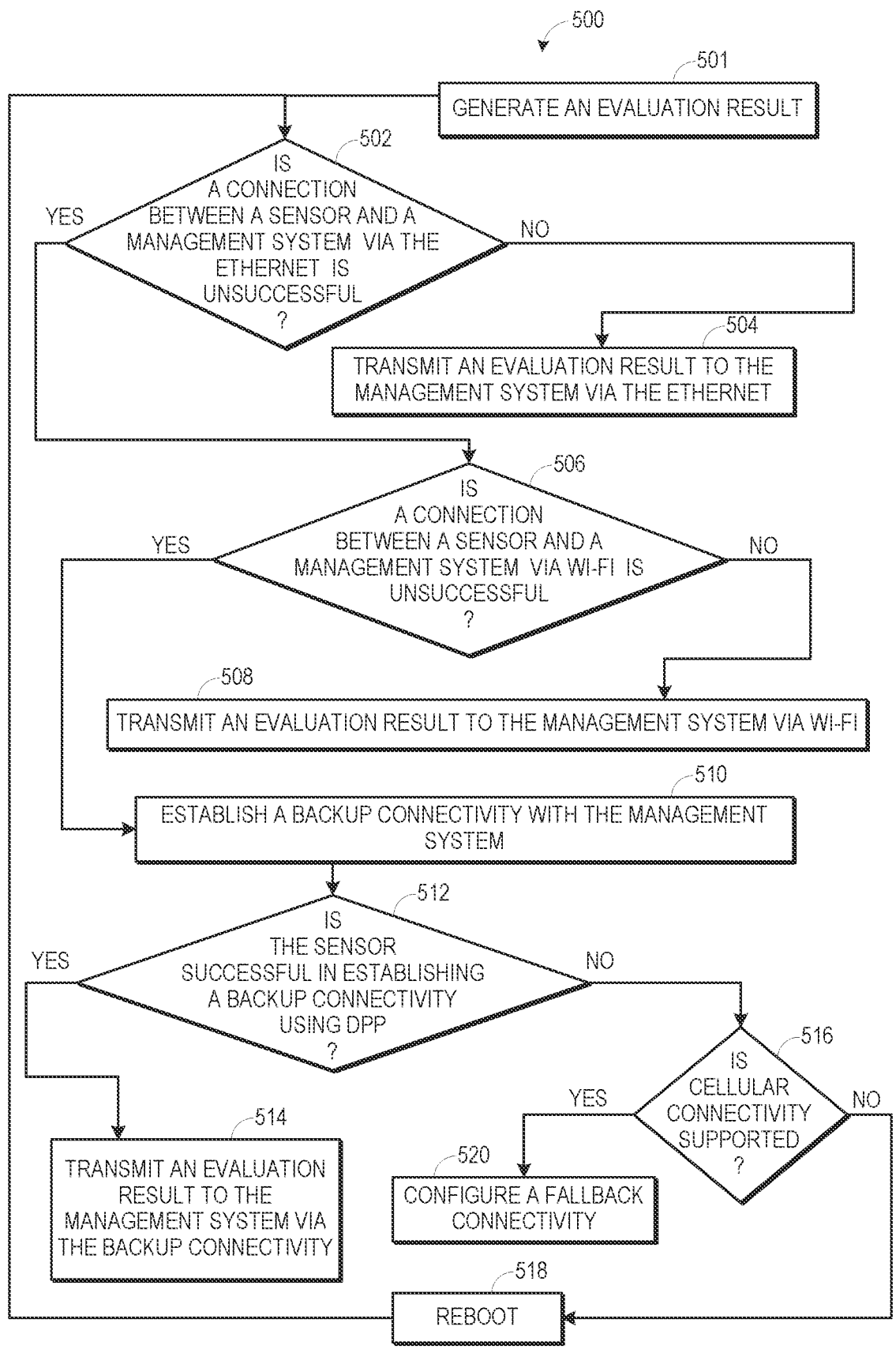
FIG. 5 depicts a flowchart of another example method for establishing backup connectivity between a sensor and a management system.
Figure 6:
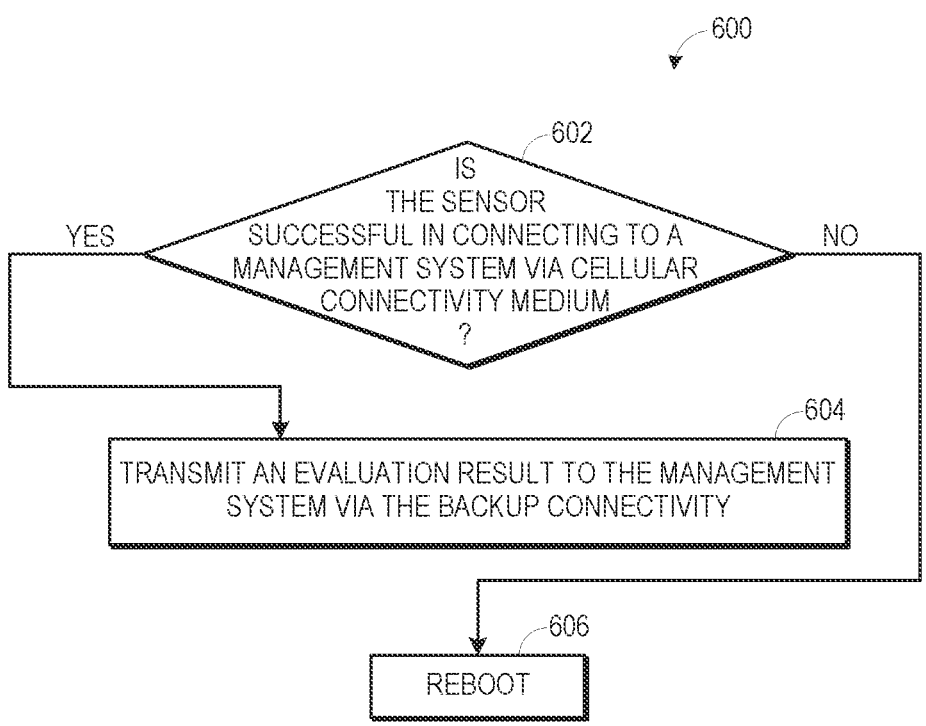
FIG. 6 depicts a flowchart of an example method for establishing fallback connectivity between a sensor and a management system using a cellular connectivity medium.

FIGS. 4 and 5 respectively represent example methods 400 and 500 for establishing a backup connectivity between a sensor and a management system. Further, FIG. 6 represents an example method 600 for establishing a fallback connectivity between a sensor and a management system. Each of the flowcharts of the methods 400, 500, and 600 depicted in FIGS. 4-6 includes several steps in an order. However, the order of steps shown in FIGS. 4-6 should not be construed as the only order for the steps. The steps may be performed at any time, in any order. Additionally, the steps may be repeated or omitted as needed. In some examples, the steps shown in FIGS. 4-6 may be performed by any suitable device, such as a sensor (e.g., the sensors 118, 300). As previously noted, a sensor deployed in an IT infrastructure executes various evaluation templates configured with respective tests and generates corresponding evaluation results. Also, the sensor may be preconfigured with a primary connectivity via a predefined connectivity medium, such as, Ethernet or Wi-Fi (e.g., via a preconfigured SSID), to communicate with a management system.

Referring now to FIG. 4, at step 402, a sensor generates an evaluation result for an IT infrastructure hosting the sensor by executing one or more evaluation templates. Further, at step 404, the sensor may perform a check to determine whether a connection (e.g., the primary connectivity) between the sensor and the management system via the predefined connectivity medium is unsuccessful. The sensor may perform such a check upon initializing (e.g., upon starting up) or during runtime. In particular, at step 404, the sensor may check if it can connect to a device gateway (e.g., the device gateway 206) which in turn would allow the sensor to communicate with the management system. In one example, the sensor may execute a gateway check test to determine if the device gateway associated with the management system is reachable. In another example, the sensor may execute an external connectivity check to check if the sensor can connect to an external endpoint such as, a URL or an IP address, associated with the management system. If the device gateway is reachable and/or the external endpoint associated with the management system is accessible, the sensor may determine that the primary connectivity between the sensor and the management system is successful. Otherwise, the sensor may determine that the primary connectivity between the sensor and the management system is unsuccessful.

At step 404, if it is determined that the primary connectivity between the sensor and the management system via the predefined connectivity medium is successful, at step 406, the sensor may transmit the evaluation result to the management system using the primary connectivity. For example, the sensor may transmit the evaluation result to the management system via the preconfigured SSID or Ethernet. However, at step 404, if it is determined that the primary connectivity between the sensor and the management system via the predefined connectivity medium is unsuccessful, at step 408, the sensor establishes backup connectivity with the management system. In some examples, the backup connectivity is established by successfully connecting to an available wireless network using security credential received by the sensor upon successful authentication via an authentication server. The authentication server accomplishes the authentication of the sensor by verifying the public key information of the sensor by checking it in a bootstrap key database comprising information related to public keys of registered sensors of the management system. Upon successful authentication of the sensor, the sensor receives an SSID of the available wireless network and the security credential to access the SSID. Additional details of the sensor establishing the backup connectivity are described in conjunction with a sequence diagram depicted in FIG. 7.

After the backup connectivity is established, at step 410, the sensor transmits the evaluation result to the management system via the backup connectivity.

Referring now to FIG. 5, a flowchart of another example method 500 for establishing a backup connectivity between a sensor and a management system is presented. In particular, at step 501, the sensor generates an evaluation result for an IT infrastructure hosting the sensor by executing one or more evaluation templates. Further, at step 502, the sensor may perform a check to determine whether a primary connectivity between the sensor and the management system via the Ethernet is unsuccessful. The sensor may perform such a check upon initializing (e.g., upon starting up) or during runtime. In particular, at step 502, the sensor may check if it can connect to a device gateway associated with the management system via a preconfigured Ethernet port on the sensor. For example, the sensor may check if the device gateway associated with the management system is reachable via the preconfigured Ethernet port. In another example, the sensor may connect to a URL or an IP address associated with the management system via the preconfigured Ethernet port. If the device gateway is reachable and/or the external endpoint associated with the management system is accessible via the preconfigured Ethernet port, the sensor may determine that the primary connectivity via the Ethernet between the sensor and the management system is successful. Otherwise, the sensor may determine that the primary connectivity with the management system via the Ethernet is unsuccessful.

At step 502, if it is determined that the primary connectivity between the sensor and the management system via the Ethernet is successful, at step 504, the sensor may transmit the evaluation result to the management system via the Ethernet. However, at step 502, if it is determined that the primary connectivity between the sensor and the management system via the Ethernet is unsuccessful, at step 506, the sensor may perform another check to determine whether a primary connectivity between the sensor and the management system via a preconfigured Wi-Fi (e.g., the preconfigured SSID) is unsuccessful. In particular, at step 506, the sensor may check if it can connect to the device gateway associated with the management system via the preconfigured SSID. For example, the sensor may check if the device gateway associated with the management system is reachable via the preconfigured SSID. In another example, the sensor may try to connect to a URL or an IP address associated with the management system via the preconfigured SSID. If the device gateway is reachable and/or the external endpoint associated with the management system is accessible via the preconfigured SSID, the sensor may determine that the primary connectivity via the preconfigured Wi-Fi is successful. Otherwise, the sensor may determine that the primary connectivity with the management system via the preconfigured Wi-Fi is unsuccessful.

At step 506, if it is determined that the primary connectivity between the sensor and the management system via the preconfigured Wi-Fi is successful, at step 508, the sensor may transmit the evaluation result to the management system via the preconfigured Wi-Fi. However, at step 506, if it is determined that the primary connectivity between the sensor and the management system via the preconfigured Wi-Fi is unsuccessful, at step 510, the sensor establishes a backup connectivity with the management system. Details of the sensor establishing the backup connectivity are described in conjunction with a sequence diagram depicted in FIG. 7.

Further, at step 512, the sensor may perform yet another check to determine if the sensor has been successful in establishing the backup connectivity. The sensor is considered to have successfully established the backup connectivity if the sensor has associated with a peer AP using network access information obtained upon successful authentication (described later). At step 512, if it is determined that the sensor has been successful in establishing the backup connectivity, the step 514, the sensor transmits the evaluation result to the management system via the backup connectivity. However, at step 512, if it is determined that the sensor is unsuccessful in establishing the backup connectivity, at step 516, The sensor may perform another check to determine if a cellular connectivity medium such as a SIM (or any other electronic chip or circuit capable of cellular handling communication) is installed in the sensor (i.e., whether the sensor can support cellular communications). At step 516 if it is determined that the cellular connectivity medium is not installed (i.e., the sensor cannot support cellular communications), at step 518, the sensor may reboot itself. In some example implementations, the sensor may be configured to retry establishing the connections to the management system via the Ethernet, the Wi-Fi, and/or the backup connectivity, for a predetermined number of times, before rebooting itself. Further, upon successful reboot, the sensor may again execute operation at step 502. However, at step 516, if it is determined that the cellular connectivity medium is installed (i.e., the sensor can support cellular communications), at step 520, the sensor may configure fallback connectivity via the cellular connectivity medium. Additional details of configuring the fallback connectivity are described in conjunction with FIG. 6.

Turning now to FIG. 6, a flowchart of an example method 600 for establishing a fallback connectivity between a sensor and a management system is presented. In one example, the method 600 may represent a sequence of operations performed to execute the method at step 520 of FIG. 3. At step 602, the sensor may perform a check to determine if the sensor can connect to the management system via a cellular connectivity medium, for example, a SIM configured with a mobile carrier. In one example, the sensor may perform such a check upon determining that the sensor can support cellular communications. In particular, at step 602, the sensor may check if it can connect to a device gateway via the cellular connectivity medium. For example, the sensor may check if the device gateway associated with the management system is reachable via the cellular connectivity medium. In another example, the sensor may try to connect to a URL, or an IP address associated with the management system via the cellular connectivity medium. If the device gateway is reachable and/or the external endpoint associated with the management system is accessible via the cellular connectivity medium, the sensor may determine that the sensor can connect to the management system via the cellular connectivity medium. Such connectivity established between the sensor and the management system via the cellular connectivity medium is referred to the fallback connectivity. Otherwise, the sensor may determine that the sensor is unable to connect to the management system via the cellular connectivity medium.

At step 602, if it is determined that the sensor can connect to the management system via the cellular connectivity medium, the sensor, at step 604, may transmit evaluation results to the management system using the fallback connectivity established via the cellular connectivity medium. However, at step 602, if it is determined that the sensor is has failed to connect to the management system via the cellular connectivity medium, the sensor, at step 606, the sensor may reboot itself, in some examples. In some example implementations, the sensor may be configured to retry establishing the cellular connectivity, for a predetermined number of times, before rebooting itself.

Figure 7:
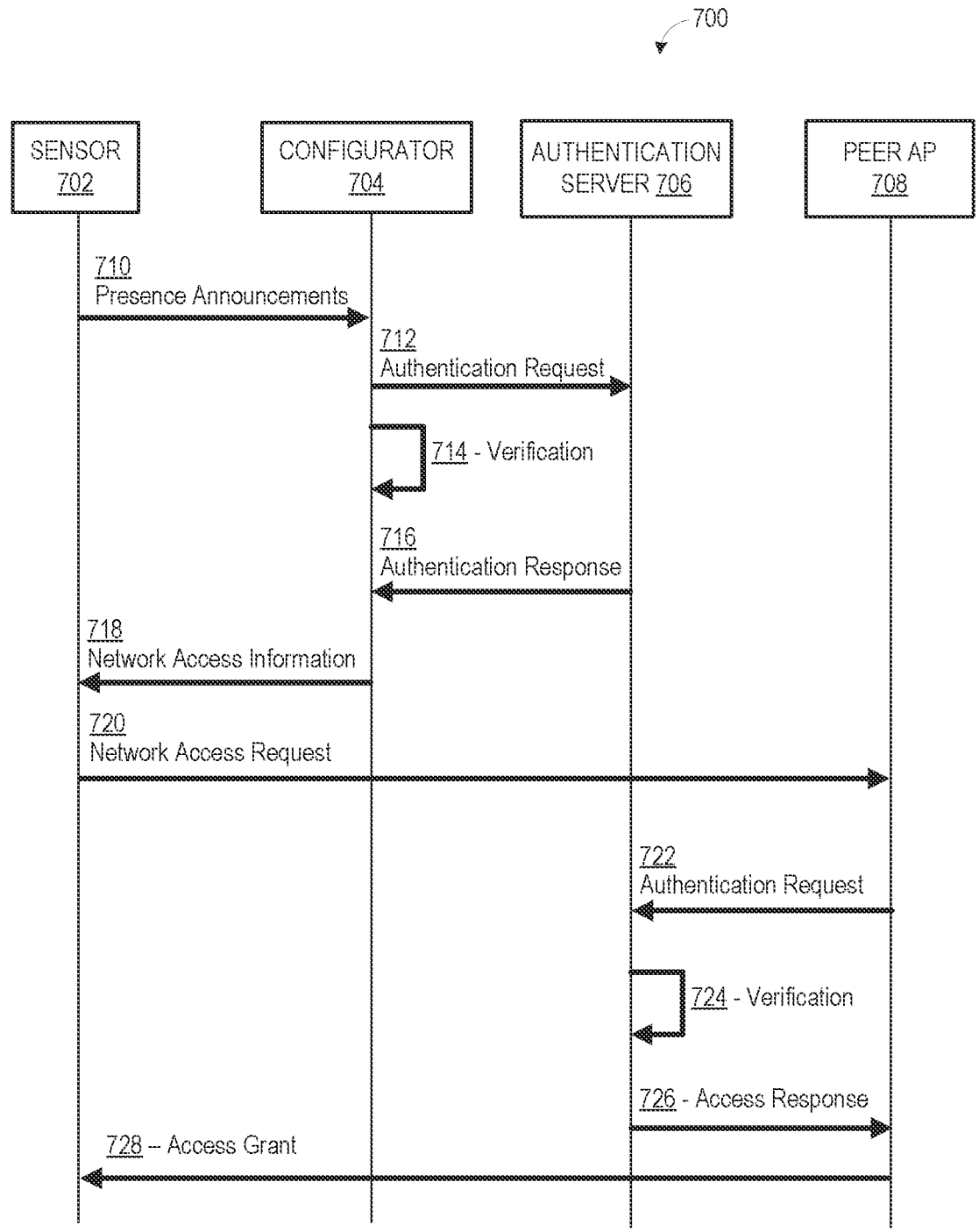
FIG. 7 illustrates a sequence diagram depicting an example sequence of operations for establishing backup connectivity between a sensor and a management system.

FIG. 7 illustrates a sequence diagram 700 depicting an example sequence of operations for establishing a backup connectivity between a sensor and a management system. The sequence diagram 700 depicts interactions between various entities such as a sensor 702, a configurator 704, an authentication server 706, and a peer AP 708 (hereinafter referred to as entities 702-708). In one example, the entities 702-708 may be deployed in a system such as the system 100 of FIG. 1. For illustration purposes, the sensor 702, the configurator 704, the authentication server 706, and the peer AP 708 are example representatives of the sensor 118, the AP 106A, the authentication server 120, and the AP 106B, respectively. In another example, the configurator 704 may be any other AP (e.g., the AP 106C) or a controller (e.g., the controller 104). In some examples, the configurator 704 and the peer AP 708 may be implemented as a single device (i.e., the same device acting as both the configurator 704 and the peer AP 708).

Also, for the purpose of illustration, in the example sequence diagram 700 depicted in FIG. 7, it is assumed that the entities 702-708 are preconfigured to communicate using a common provisioning protocol, for example, DPP. For example, during an initial set-up stage, the configurator 704 may be configured to listen to messages (e.g., messages compliant to DPP) broadcasted over specific communication channels and is provided with network access information. The network access information may include a network name (e.g., an SSID) and a security credential to provide access to an available wireless network identified via the SSID. The configurator 704 may provision this network access information an authenticated device to provide a backup connectivity to the authenticated device. In some examples, the network access information may be in the form of a DPP connector. In an example, the network access information also may include information related to the channels to be used by the configurator 704. Once configured, the configurator 704 may advertise its ability to communicate using DPP on the communication channels.

In some examples, upon determining by the sensor 702 that the connection to the management system is unsuccessful via the primary connectivity, the sensor 702 may scan one or more communication channels over which the sensor 702 can initiate communication to establish the backup connectivity. In some examples, the sensor 702 may scan one or more communication channels for identifying channels supporting DPP. At step 710, the sensor 702 may transmit presence announcements on such channels. In one example, the presence announcements are compliant with the DPP and are carried by IEEE 802.11 action frames. The presence announcements may include the hash of the public bootstrapping key of the sensor 702. In some examples, the APs that are configured with the DPP in a radio frequency range of the sensor 702 may receive the presence announcements from the sensor 702. For the purpose of illustration here it is considered that the configurator 704 receives such presence announcements from the sensor 702.

In response to receiving the presence announcements from the sensor 702, the configurator 704, at step 712, initiates the authentication of the sensor 702 through the authentication server 706. In one example, the authentication of the sensor 702 may be performed in accordance with DPP. In particular, at step 712, the configurator 704 transmits a bootstrap authentication request (e.g., DPP bootstrap authentication request) to the authentication server 706. The bootstrap authentication request is generated based on a public bootstrap key of the sensor 702. In particular, in some examples, the bootstrap authentication request may include a hash of the public bootstrap key of the sensor 702. Responsive to receiving the bootstrap authentication request, the authentication server 706, at step 714, performs a check to determine if the public bootstrap key of the sensor 702 is registered with the authentication server 706. In particular, the authentication server 706 searches the bootstrap key database to find a match for the public bootstrap key (or the hash of the public bootstrap key) of the sensor 702.

If the public bootstrap key (or the hash of the public bootstrap key) of the sensor 702 is found in the bootstrap key database, the authentication server 706 may determine that the sensor is registered with the management system and is determined as authorized to communicate with the management system. Accordingly, at step 716, the authentication server 706 may send a positive authentication response to the configurator. In case the public bootstrap key received in the bootstrap authentication request is not found in the bootstrap key database at the authentication server 706, the authentication server 706 may determine that the sensor 702 is not registered with the management system and cannot be authorized to communicate with the management system. In such a case the authentication server 706 may send a negative authentication response denying access of the network in an IT infrastructure.

In response to the receipt of the positive authentication response, the configurator 704, at step 718, may transmit the network access information to the sensor 702. In some examples, the network access information may be in the form of a DPP connector. The network access information includes an SSID of the available wireless network to which the sensor can connect and a security credential to connect to the SSID. The sensor 702 uses the security credential contained in the network access information to request network access. In one example, the network access information may include a hash of the public network access key of the SSID. With the transmission of the network access information to the sensor 702, the sensor 702 is considered to be authorized to connect to the SSID. The sensor 702 can use the DPP connector to request network access through the SSID via any of the APs (within the RF range of the sensor 702) that advertise the SSID. In some examples, the configurator 704 bind may transmit a DPP identity binding request to the authentication server 706 for binding the network access information with the public bootstrapping key of the sensor. Such binding of the network access information with the public bootstrapping key of the sensor 702 allows the authentication server 706 to perform additional verification of the public bootstrapping key and the network access information when the sensor 702 attempts to connect to the SSID for network access (e.g., for establishing the backup connectivity).

In some examples, the sensor 702 may discover several SSIDs in its vicinity to establish a backup connectivity with the management system. In particular, the sensor 702 may establish, upon successful verification of the security credential via the authentication server 706, a Wi-Fi connection with the peer AP 708 through the SSID that the sensor received from the configurator 704. In some examples, at step 720, the sensor 702 may send a network access request to connect to the SSID that it received from the configurator 704. For example, an AP, such as the peer AP 708, may receive such a network access request from the sensor 702. The network access request may include the DPP connector and the SSID to which the sensor 702 can connect. In some examples, the SSID that the sensor 702 is attempting to connect at step 720 may be configured on the peer AP 708 to use any of the radios, for example, a 2.4 Gigahertz (Ghz) radio or 5 Ghz radio of the peer AP 708.

Responsive to receiving the network access request, the peer AP 708, at step 722, may transmit an access request to the authentication server 706 to authenticate the sensor 702. The authentication server 706, at step 724, may verify the network access information and its binding with the public bootstrapping key of the sensor 702. Upon successful verification of the network access information and its binding with the public bootstrapping key of the sensor 702, the authentication server 706, at step 726, may send an access-accept response to the peer AP 708. Upon receipt of the access-accept response, the peer AP 708, at step 728, may grant the sensor 702 and access to the SSID.

In some examples, the authentication server 706 may be configured to specify certain attributes, also referred to as, vendor-specific attributes (VSAs) in the access-accept response to control how the data traffic related to the sensor 702 may be handled by the peer AP. For example, the authentication server 706 formulates the access-accept response to include VSAs such as a VSA specifying a predefined virtual local area network (VLAN) (hereinafter referred to as VLAN VSA) and/or a VSA specifying a secure domain (hereinafter referred to as a security VSA). A VLAN is a subnetwork within a LAN in which certain network devices are grouped and managed with common network policies. If the peer AP 708, determines that the access-accept response includes the VLAN VSA, the peer AP 708 may configure the sensor 702 into the predefined VLAN specified in the VLAN VSA. In particular, the predefined VLAN is configured with one or more rules to classify data traffic related to the sensor 702 or one or more of collecting statistics relevant to the data traffic, logging the data traffic, or shaping the data traffic.

Further, in some examples, the peer AP 708 may determine whether the access-accept response includes the security VSA specifying a particular security domain. The peer AP 708 may classify data traffic originating from the sensor 702 and directed to the management system as per a secure domain rule to securely prioritize the data traffic. By way of example, the security VSA cause the peer AP 708 to configure the secure domain rule for the data traffic related to the sensor. With such a secure domain rule, the peer AP 708 monitors a destination IP address in the packets originating from the sensor and processes the packets that are destined for the management system. If the destination IP address is identified to be different from the IP address of the management system, the peer AP 708 may take security action. For example, the security action may include dropping the packet. As a result, by any chance, if the sensor is compromised and tries to send data packets with evaluation results to any destination other than the management system, such data packets may be dropped.

If the sensor 702 is granted an access, the sensor 702 may derive a pairwise master key (PMK)/PMK identity (PMKID), performs IEEE-802.11 4-way handshake with the peer AP 708, and ultimately gets network access via the SSID. Accordingly, the sensor 702 can connect to the management system via such backup connectivity through the SSID obtained from the configurator 704. Once connected, the sensor 702 transmits evaluation results to the management system via such backup connectivity.

Figure 8:
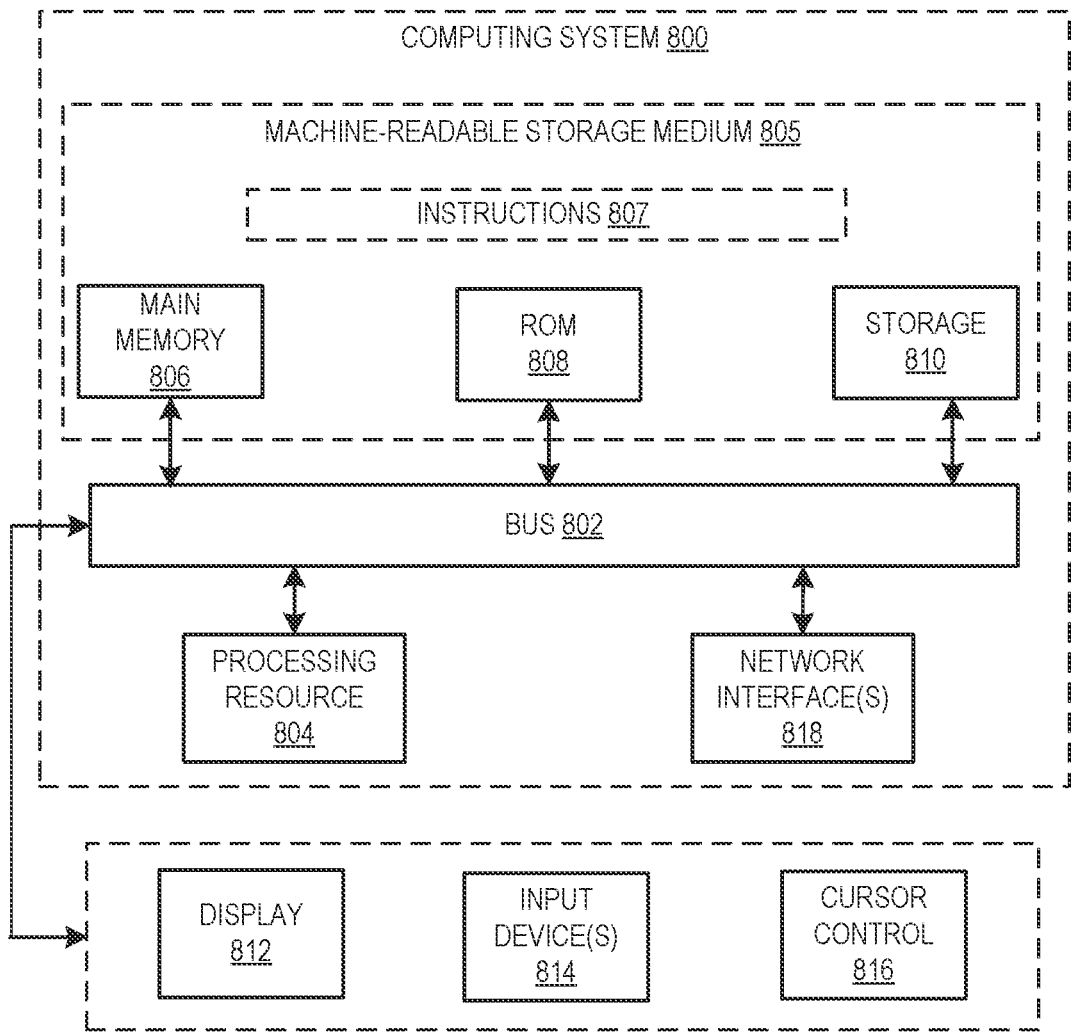
FIG. 8 depicts a block diagram of an example computing system in which various of the examples described herein may be implemented.

FIG. 8 depicts a block diagram of an example computing system 800 in which various of the examples described herein may be implemented. In some examples, the computing system 800 may be configured to operate as any of a sensor (e.g., the sensor 118, 300, 702), a configurator (e.g., the configurator 704), a peer AP (e.g., peer AP 708), or an authentication server (e.g., the authentication server 120, 706) can perform respective various operations described one or more of the earlier drawings.

The computing system 800 may include a bus 802 or other communication mechanisms for communicating information, a hardware processor, also referred to as processing resource 804, coupled to the bus 802 for processing information. The processing resource 804 and the non-transitory machine-readable storage medium 805 may include example implementations as described with reference to the processing resource 306 and the machine-readable storage medium 304, respectively. The computing system 800 may also include a non-transitory machine-readable storage medium 805 communicatively coupled to the bus 802. In some examples, the machine-readable storage medium 805 may include a main memory 806, such as a RAM, cache and/or other dynamic storage devices, coupled to the bus 802 for storing information and instructions to be executed by the processing resource 804. The main memory 806 may also be used for storing temporary variables or other intermediate information during the execution of instructions to be executed by the processing resource 804. Such instructions, when stored in storage media accessible to the processing resource 804, render the computing system 800 into a special-purpose machine that is customized to perform the operations specified in the instructions.

The machine-readable storage medium 805 may further include a read-only memory (ROM) 808 or other static storage device coupled to the bus 802 for storing static information and instructions for the processing resource 804. Further, in the machine-readable storage medium 805, a storage device 810, such as a magnetic disk, optical disk, or USB thumb drive (Flash drive), etc., may be provided and coupled to the bus 802 for storing information and instructions.

Further, in some implementations, the computing system 800 may be coupled, via the bus 802, to a display 812, such as a liquid crystal display (LCD) (or touch-sensitive screen), for displaying information to a computer user. In some examples, an input device 814, including alphanumeric and other keys (physical or software generated and displayed on touch-sensitive screen), may be coupled to the bus 802 for communicating information and command selections to the processing resource 804. Also, in some examples, another type of user input device may be a cursor control 816, such as a mouse, a trackball, or cursor direction keys may be connected to the bus 802. The cursor control 816 may communicate direction information and command selections to the processing resource 804 for controlling cursor movement on the display 812. In some other examples, the same direction information and command selections as cursor control may be implemented via receiving touches on a touch screen without a cursor.

In some examples, the computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 800 also includes a network interface 818 coupled to bus 802. The network interface 818 provides a two-way data communication coupling to one or more network links that are connected to one or more local networks. For example, the network interface 818 may be an integrated services digital network (ISDN) card, cable modem, satellite modem, or a modem to provide a data communication connection to a corresponding type of telephone line. As another example, the network interface 818 may be a local area network (LAN) card or a wireless communication unit (e.g., Wi-Fi chip/module).

In some examples, the machine-readable storage medium 805 (e.g., one or more of the main memory 806, the ROM 808, or the storage device 810) may store instructions 807 which when executed by the processing resource 804 may cause the processing resource 804 to execute one or more of the methods/operations described hereinabove. The instructions 807 may be stored on any of the main memory 806, the ROM 808, or the storage device 810. In some examples, the instructions 807 may be distributed across one or more of the main memory 806, the ROM 808, or the storage device 810. In some examples, the instructions 807 may include instructions which when executed by the processing resource 804 may cause the processing resource 804 to perform one or more of the steps described in FIGS. 4-7.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise.

What is claimed is:

1. A method comprising:
generating, by a sensor, an evaluation result for an information technology (IT) infrastructure, wherein the sensor is deployed in the IT infrastructure, and wherein the sensor is preconfigured to transmit the evaluation result to a management system hosted outside the IT infrastructure via a primary connectivity between the sensor and the management system;
establishing, by the sensor, a backup connectivity with the management system in response to determining that a connection between the sensor and the management system via the primary connectivity is unsuccessful, wherein establishing the backup connectivity comprises successfully connecting to an available wireless network using security credential received by the sensor upon successful authentication of the sensor via an authentication server, wherein the authentication server stores a bootstrap key database comprising information related to public keys of registered sensors of the management system, and wherein the authentication server verifies public key information of the sensor using the bootstrap key database to authenticate the sensor; and
transmitting, by the sensor, the evaluation result to the management system via the backup connectivity.

2. The method of claim 1, wherein the primary connectivity between the sensor and the management system is established via a Ethernet.

3. The method of claim 1, wherein the primary connectivity between the sensor and the management system is established via a preconfigured Wi-Fi.

4. The method of claim 1, wherein the backup connectivity provides a seamless connection between the sensor and the management system, saves configuration effort for a network administrator of the IT infrastructure, and reduces a support dependency on a support engineer.

5. The method of claim 1, wherein establishing the backup connectivity comprises:
transmitting, by the sensor, a presence announcement; and
receiving, by the sensor, network access information from a configurator access point (AP) upon successful authentication of the sensor via the authentication server, wherein the network access information comprises a Service Set Identifier (SSID) of the available wireless network and a security credential to connect to the SSID.

6. The method of claim 5, wherein, in response to receiving the presence announcement by the configurator AP, initiating, by the configurator AP, the authentication of the sensor via the authentication server.

7. The method of claim 5, wherein establishing the backup connectivity further comprises establishing a Wi-Fi connection with a peer AP via the SSID and the security credential upon successful verification of the security credential via the authentication server.

8. The method of claim 7, wherein establishing the Wi-Fi connection comprises:
receiving, by the peer AP, a network access request to connect to the SSID from the sensor;
transmitting, by the peer AP, an access request to the authentication server responsive to receiving the network access request; and
receiving, by the peer AP, an access-accept response from the authentication server upon successful verification of the security credential.

9. The method of claim 8, wherein the access-accept response comprises one or both of a first vendor-specific attribute (VSA) specifying a predefined virtual local area network (VLAN) identifier or a second VSA specifying a secure domain.

10. The method of claim 9, further comprising configuring, by the peer AP, the sensor into the predefined VLAN responsive to identifying the first VSA in the access-accept response, wherein the predefined VLAN is configured with one or more rules to classify data traffic related to the sensor for one or more of collecting statistics relevant to the data traffic, logging the data traffic, or shaping the data traffic.

11. The method of claim 10, further comprising classifying, by the peer AP, data traffic originated from the sensor and directed to the management system into the secure domain responsive to identifying the second VSA in the access-accept response.

12. The method of claim 8, wherein the SSID is configured on the peer AP to use 2.4 Ghz radio or 5 Ghz radio of the peer AP.

13. A sensor comprising:
a machine-readable storage medium storing instructions; and
a processing resource coupled to the machine-readable storage medium, wherein the processing resource executes one or more of the instructions to:
generate an evaluation result for an information technology (IT) infrastructure, wherein the sensor is deployed in the IT infrastructure, and wherein the sensor is preconfigured to transmit the evaluation result to a management system hosted outside the IT infrastructure via a primary connectivity between the sensor and the management system;
establish a backup connectivity with the management system in response to determining that a connection of the sensor with the management system via the primary connectivity is unsuccessful, wherein establishing the backup connectivity comprises successfully connecting to an available wireless network using security credential received by the sensor upon successful authentication of the sensor via an authentication server, wherein the authentication server stores a bootstrap key database comprising information related to public keys of registered sensors of the management system, and wherein the authentication server verifies public key information of the sensor using the bootstrap key database to authenticate of the sensor; and
transmit the evaluation result to the management system via the backup connectivity through the available wireless network.

14. The sensor of claim 13, wherein the processing resource executes one or more instructions to:
determine whether the sensor has failed to establish the backup connectivity; and
in response to determining that the sensor has failed to establish the backup connectivity, determine if the sensor is able to connect to the management system via a cellular connectivity medium; and
transmit the evaluation result to the management system via the cellular connectivity medium in response to determining that the sensor is able to connect to the management system via the cellular connectivity medium.

15. The sensor of claim 14, wherein the sensor is not required to use the cellular connectivity medium if the backup connectivity is successfully established resulting in reduced an operational cost for the sensor and minimizing any reliability issues related to the cellular connectivity medium thereby improving user experience.

16. The sensor of claim 13, wherein to establish the backup connectivity, the processing resource executes one or more instructions to:
transmitting, by the sensor, a presence announcement; and
receiving, by the sensor, network access information from a configurator access point (AP) upon successful authentication of the sensor via the authentication server, wherein the network access information comprises a Service Set Identifier (SSID) of the available wireless network and a security credential to connect to the SSID.

17. A system comprising:
a backend system deployed on a cloud and hosting a management system and an authentication server; and
a sensor deployed in an information technology (IT) infrastructure coupled to the backend system via a network, wherein the sensor is configured to:
generate an evaluation result for an IT infrastructure, wherein the sensor is preconfigured to transmit the evaluation result to the management system via a primary connectivity between the sensor and the management system;
establish a backup connectivity with the management system in response to determining that a connection of the sensor with the management system via the primary connectivity is unsuccessful, wherein establishing the backup connectivity comprises successfully connecting to an available wireless network using security credential received by the sensor upon successful authentication of the sensor via an authentication server, wherein the authentication server stores a bootstrap key database comprising information related to public keys of registered sensors of the management system, and wherein the authentication server verifies public key information of the sensor using the bootstrap key database to authenticate of the sensor; and
transmit the evaluation result to the management system via the backup connectivity through the available wireless network.

18. The system of claim 17, wherein the backend system further comprises an application programming interface (API) to enable communication between the management system and the sensor.

19. The system of claim 17, wherein to establish the backup connectivity, the sensor is configured to:
transmit a presence announcement; and
receive network access information from a configurator access point (AP) upon successful authentication, wherein the network access information comprises a Service Set Identifier (SSID) and a security credential to connect to the SSID.

20. The system of claim 19, wherein the authentication server is configured to update the bootstrap key database by querying the authentication server or periodically receiving the public key information of the registered sensors from the management system.

* * * * *